(12) United States Patent
Whalley

(10) Patent No.: US 6,233,558 B1
(45) Date of Patent: May 15, 2001

(54) METHOD AND APPARATUS FOR SIMULTANEOUS TRACING OF MULTIPLE TRANSMISSION LINES

(75) Inventor: Paul L. Whalley, Vista, CA (US)

(73) Assignee: Tempo Research Corporation, Vista, CA (US)

( * ) Notice: Subject to any disclaimer, the term of this patent is extended or adjusted under 35 U.S.C. 154(b) by 0 days.

(21) Appl. No.: 09/022,156

(22) Filed: Feb. 11, 1998

(51) Int. Cl.$^7$ ............... G10L 3/00; G10L 5/02; G10L 9/00; H04B 3/46
(52) U.S. Cl. ............ 704/270; 704/268; 324/66; 379/6; 379/29
(58) Field of Search .................. 704/270, 275, 704/268; 324/66

(56) References Cited

U.S. PATENT DOCUMENTS

| | | |
|---|---|---|
| 3,903,380 * | 9/1975 | Schomburg .......... 704/270 |
| 4,430,530 | 2/1984 | Kandell et al. . |
| 4,449,231 | 5/1984 | Chytil . |
| 4,670,898 | 6/1987 | Pierce et al. . |
| 5,073,919 | 12/1991 | Hagensick . |
| 5,557,651 | 9/1996 | Wissman . |
| 5,633,909 | 5/1997 | Fitch . |
| 5,644,617 | 7/1997 | Schmidt . |

* cited by examiner

*Primary Examiner*—Fan Tsang
*Assistant Examiner*—Robert Louis Sax
(74) *Attorney, Agent, or Firm*—Amster, Rothstein & Ebenstein

(57) ABSTRACT

A method and apparatus are provided for use in tracing transmission lines from a first location to a second location. The apparatus comprises a multi-channel speech synthesizer, a digital to analog convertor and a demultiplexer. The digital synthesized speech which can take any form is applied to a digital to analog convertor where it is transformed into an analog stream of distinct speech segments. In accordance with the corresponding method, the distinct speech segments are selectively connected by the multiplexer to one or more of the transmission lines to be traced. At the second location, the distinct speech segments are detected. As each distinct speech segment is associated with a particular transmission line, it is possible to distinguish between the many transmission lines which are being simultaneously traced.

12 Claims, 3 Drawing Sheets

| DIGIT | ROM LOCATIONS |
|---|---|
| 1 | 0, 8, 16, . . . 32760 |
| 2 | 1, 9, 17, . . . 32761 |
| 3 | 2, 10, 18, . . . 32762 |
| 4 | 3, 11, 19, . . . 32763 |
| . . . | |
| 8 | 7, 15, 23, . . . 32767 |

FIG. 3

| CLOCK CYCLE | ROM OUTPUT |
|---|---|
| 0 | "1" byte 0 |
| 1 | "2" byte 0 |
| . . . | |
| 7 | "8" byte 0 |
| 8 | "1" byte 1 |
| 9 | "2" byte 1 |
| . . . | |
| 15 | "8" byte 1 |
| . . . | |
| 32760 | "1" byte 4095 |
| 32761 | "2" byte 4095 |
| . . . | |
| 32767 | "8" byte 4095 |

FIG. 4

METHOD AND APPARATUS FOR SIMULTANEOUS TRACING OF MULTIPLE TRANSMISSION LINES

BACKGROUND OF THE INVENTION

1. Field of the Invention

The present invention relates generally to an improved method and apparatus for tracing a plurality of transmission lines from a first location to a second location. Specifically, the present invention is useful for simultaneously tracing a plurality of transmission lines contained within a telecommunications cable.

2. Prior Art

Modern copper telecommunications cables typically contain as many as 600 twisted wire pairs ("line pairs") and may extend several miles in length. Often it becomes necessary to monitor the performance of a given line pair or a number of line pairs within a telecommunications cable. In order to reduce the cost and the time required to trace line pairs, it is highly desirable to be able to trace several line pairs simultaneously.

Apparatuses for tracing line pairs within telecommunications cables are well known in the art. A typical apparatus employs a signal generator which applies a square wave signal to a single line pair. The square wave signal is typically on the order of 5–10 volts in amplitude and has a frequency within the range of 400–1500 Hz. The signal may be continuous or may be switched between two frequencies to add a "warble" sound which is easier for an operator or technician to detect.

In operation, the signal generator is connected to one end of the line pair to be traced and at the opposite end of the cable a high input impedance amplifier is held in close proximity to the line pairs. When the amplifier is close to the actual line pair carrying the square wave signal, the signal is capacitively coupled to the amplifier and becomes audible. The audible signal is then used to identify a particular line pair.

Typically in the prior art, if another line is to be traced, the signal generator must first be disconnected from its current line pair and connected to the next line pair to be traced. Having to switch the square wave generator for each line pair to be traced (each "traced line pair"), is very time consuming particularly when the traced line pairs are part of a telecommunications cable several miles in length.

More recently, devices capable of generating multiple-frequency sequences have been employed in situations where several lines are to be traced. It has been found that the use of such quasi-melodic multi-tone sequences facilitate the technician being able to distinguish between signals and, accordingly, between lines.

The apparatus disclosed in U.S. Pat. No. 5,557,651, which is owned by the Assignee of the present application, is capable of simultaneously tracing a plurality of line pairs by the application of multiple frequency sequences. The disclosed apparatus comprises a signal generator capable of generating at least one signal and a number of switches for operatively coupling the signal to one or more of a number of line pairs. In the preferred embodiment, the signal generator is capable of outputting signals of different frequency in the audio range which can be detected and used by the technician to easily distinguish between line pairs.

Although such an apparatus and corresponding method is effective for tracing multiple line pairs, there is a practical limit to the number of lines that can be simultaneously traced. While in theory it might be possible to generate almost limitless combinations of tones, it becomes difficult, if not impossible, for the technician to identify and distinguish the increasingly complex sequences. Thus, there continues to exist a need in the art for a method and apparatus that will permit simultaneous tracing of a virtually unlimited number of transmission lines.

It is also known in the art to produce signals which simulate speech for use in the evaluation of voice transmission systems in telephony. To that end, signal generators have been provided which produce a signal approximating speech. Such a signal generator is disclosed in U.S. Pat. No. 4, 449,231. The disclosed signal generator is adapted to produce a signal which accurately simulates the syllabic rate of real speech. It has been found that this type of accuracy is necessary in order to properly evaluate the performance of a voice transmission components which may degrade and affect the overall performance of a voice transmission system.

The prior art discloses an apparatus for generating a signal which precisely simulates speech which is used to test voice sensitive components. The prior art does not disclose the application of synthesized speech to a transmission line at a first location for detection at a second location. Thus, although signal generators for simulating a speech signal are known, it is not known to utilize synthesized speech as a means for simultaneously tracing multiple transmission lines from a first location to a second location.

The present invention overcomes the shortcomings associated with the prior art apparatuses for tracing multiple lines by providing an apparatus and method that transmits easily recognizable synthesized speech over a plurality of transmission lines to be traced.

Accordingly, it is an object of the present invention to provide an improved method and apparatus for tracing a plurality of transmission lines from a first location to a second location.

It is a further object of the invention to provide a method and apparatus for simultaneously tracing a plurality of transmission lines from a first location to a second location.

A further object of the invention is to provide a method and apparatus which allows one traced line to be easily distinguished from any other traced line.

Another object of the invention is to provide a method and apparatus that allows the human ear to be used to easily distinguish one traced line from any other traced line.

SUMMARY OF THE INVENTION

These and other objects are met by the apparatus and method of the present invention wherein a sequence of synthetic speech signals are generated and applied to simultaneously trace a plurality of lines. The use of a synthetic speech signal is well suited for tracing multiple line pairs given a human's ability to perceive and recognize a vast number of spoken words with extreme accuracy, even under conditions of high noise or distortion. By associating each line to be traced with a unique spoken word ("tagging"), it is possible to simultaneously trace many lines . Moreover, the use of synthetic speech makes it possible for even the untrained technician to accurately identify any number of lines.

In accordance with the present invention, there is provided an apparatus for tracing one or more of a plurality of transmission lines from a first location to a second location comprising a speech synthesizing means for generating distinct segments of speech signals to be applied at a first location of the lines to be traced. A switching means is provided for selectively connecting and disconnecting the distinct segments of speech to each transmission line to be traced and a device for detecting each distinct segment at a second location of the lines being traced.

In a preferred embodiment the speech synthesizing means and switching means respectively comprise a read only memory containing pre stored digital speech data and a demultiplexer capable of selectively applying the digital speech to one or more lines to be traced.

A method of tracing a plurality of transmission lines from a first location to a second location is also provided, comprising the steps of selectively applying to one or more of the plurality of transmission lines to be traced at the first location a speech signal, wherein each of the one or more transmission lines receives a unique segment of the speech signal that differs from the segment of the speech signal applied to any other of the transmission lines.

The unique segment of the speech signal respectively applied to each transmission line is detected at the second location, thereby allowing the identity of each transmission line to be determined according to the unique speech segment respectively applied at the first location and detected at the second location.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawings, wherein:

FIG. 3 is a table showing the format in which digitized audio is stored in the apparatus of FIG. 2; and FIG. 4 is table showing the format in which digitized audio is output in the apparatus of FIG. 2.

DETAILED DESCRIPTION OF THE PREFERRED EMBODIMENT

Figure 1:
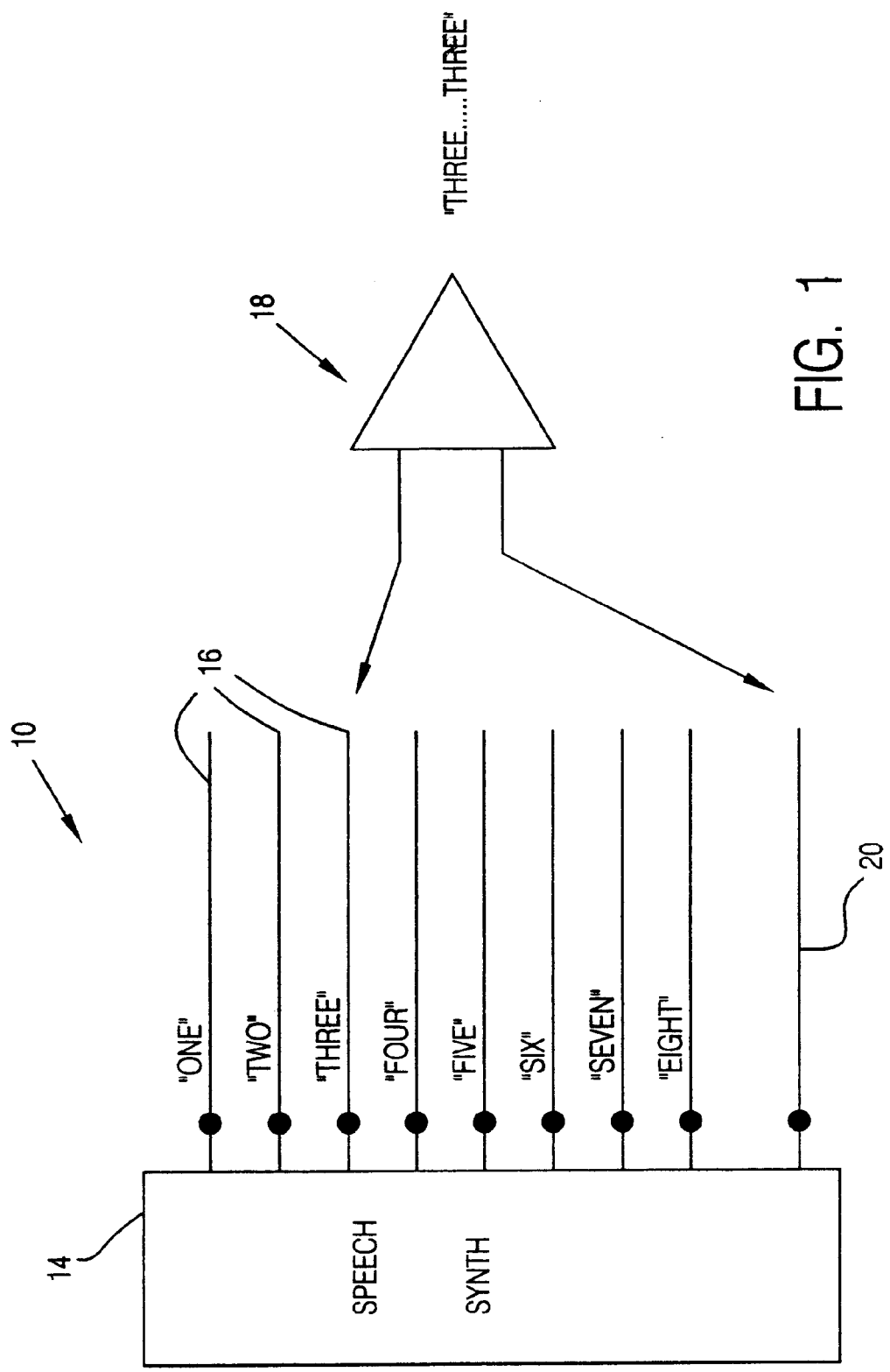
FIG. 1 is a simplified block schematic representation of a preferred embodiment of the present invention.

FIG. 1 is a simplified representation of the apparatus of the present invention generally represented by reference numeral 10 comprising a speech synthesizer 14 connected at one end of a plurality of lines 16 and a high-input impedance audio amplifier generally designated by reference numeral 18 selectively connected at the opposite end of lines 16.

As further represented in FIG. 1, the speech synthesizer 14 may simultaneously output the spoken digits "1" through "8" as audio frequency signals and transmits these signals through the lines to be identified. The high-input impedance audio amplifier 18 connects between any signal line 16 and the common line 20 allowing the user to listen to the synthetic speech (in this case a spoken digit) being transmitted on the line 16, thus allowing unambiguous identification of the line 16.

Figure 2:
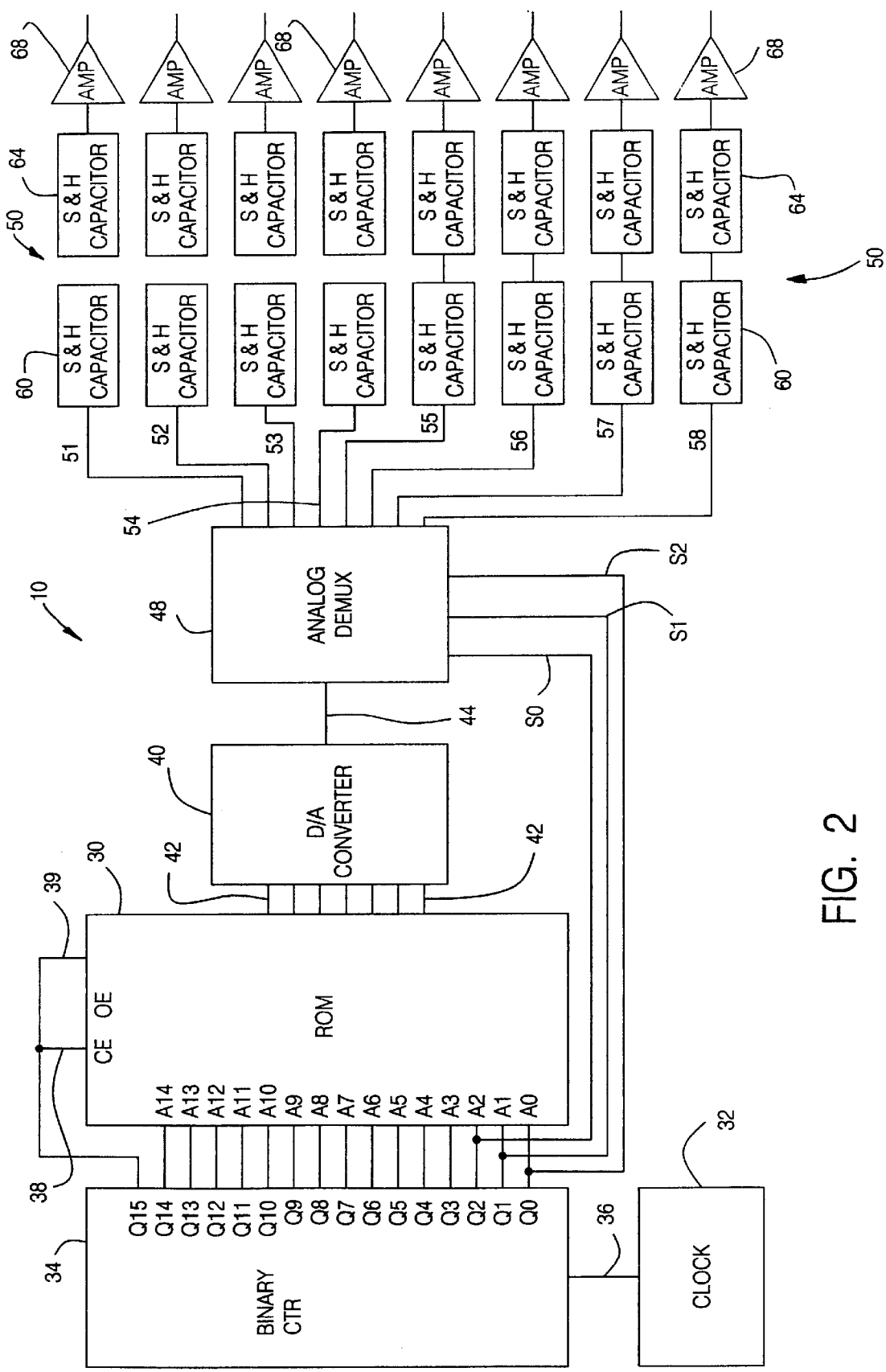
FIG. 2 is a schematic block diagram of the preferred embodiment of FIG. 1.

A more detailed representation of a preferred embodiment of the apparatus of the present invention is shown in the schematic block diagram of FIG. 2. The apparatus 10 of the present invention comprises a speech read-only-memory 30 (ROM) for the permanent storage of digitized audio such as, for example, the spoken digits "1" through "8". In the illustrated example, the spoken digits "1" through "8" are stored as eight half-second segments of speech which have been digitized at a rate of approximately 8000 samples per second. The ROM 30 is preferably organized as 32,768 (32k) eight-bit bytes with 4096 (4k) bytes allocated for each spoken digit. As shown in FIG. 3, the eight digitized digits are preferably stored in the speech ROM 30 in an interleaved format on eight-byte boundaries.

A clock 32 and binary counter 34 are provided which are responsible for all the digital control and timing functions of the present invention. The clock 32 preferably produces a square wave output 36 fixed at 64 KHz which is used to drive the binary address counter 34.

The binary counter 34 is of the conventional type preferably having 16 stages (Q0–Q15) and a clock input which is connected to the output 36 of the clock 32. As shown in FIG. 2, the counter output lines "Q0" through "Q14" are coupled to the address lines of the ROM 30 labeled as "A0" through "A14." Output line "Q15 is coupled to a device enable line ("CE") 38 and a ROM output enable line ("OE") 39 ("CE" and "OE" are preferably both active low inputs).

Next, a digital-to-analog (D/A) converter 40 is coupled to the output of the ROM 30 and used to generate a voltage at a level proportional to the magnitude of the binary value present on the output lines 42 of the speech ROM 30. In the preferred embodiment, the ROM 30 outputs a series of 7 bit binary values corresponding to the digitized words which are then acted upon by the D/A converter 40 to produce an analog representative of the spoken digits.

The analog output 44 of the D/A convertor 40 is coupled to the input of an analog demultiplexer 48. The demultiplexer 48 acts as a set of digitally-controlled analog switches which route the analog output of the D/A converter 44 to the input of any single one of eight audio channels generally designated by reference numeral 50 through output lines designated 51 through 58. The output lines are selected through three binary-coded select lines labeled S0, S0 and S2 which are coupled to the output Q0, Q1 and Q2 of the binary counter 34.

The eight audio channels 50 are identical to one another and are comprised of a sample & hold capacitor 60, a low-pass filter 64, and a buffer amplifier 68. The sample-and-hold capacitor 60 at the input temporarily stores the output level of the corresponding analog demultiplexer output ( one of 51 through 58). The low-pass filter 64, which for this example has a cut-off frequency of approximately 3.2 KHz, removes unwanted high-frequency components from the reconstructed speech signal. The buffer amplifier 68 provides increased current drive at the output of the channel.

In operation, the binary counter 34 is zeroed such that all of the counter outputs are in the zero state. Since the address lines A0–A14 of the speech ROM 30 are connected to the first fifteen outputs of the binary counter 34, it can be seen that the location addressed in the ROM 30 at any time is ROM address=(16-bit binary output) mod 32768

Also, since the two low-active ROM enables lines 38, 39 are connected to the high-order output line (Q15) of the counter 34, the ROM 30 is enabled for counter outputs from 0 to 32767 and disabled for outputs from 32768 to 65535. Therefore, with the binary counter 34 being clocked by the free-running clock 32 at a nominal value of 64 KHz, the circuit will step through the 32768 consecutive ROM locations during the first 32768 clock cycles, disable the ROM 30 during the next 32768 clock cycles, and then repeat the sequence, continuing as long as the clock generator is running. Note also that since the clock 32 is running at a nominal frequency of 64 KHz, this entire cycle is completed in approximately one second (i.e. the duration of a digitized digit).

Because the digitized digits are stored in the speech ROM 30 in an interleaved format, as the ROM 30 is scanned sequentially, the output lines 44 will present speech data in the format shown in FIG. 4.

As each digitized speech byte is output from the ROM 30, as represented in FIG. 4, the D/A converter 40 generates a corresponding voltage level. This voltage level is routed through the analog demultiplexer 48 to the appropriate one of the audio channels 50.

Output selection in the analog demultiplexer 48 is controlled by the first three outputs ("Q0", "Q1", and "Q2") of the binary counter and is thus synchronized to the address of the speech ROM 30 and, more importantly, to the eight digitized speech segments of the present example. Thus, the single analog stream containing data of all eight speech segments is synchronously parsed out to the eight individual audio channels 50 through output lines 51 through 58, each of which filters 64 and buffers 68 the reconstructed signal for a single spoken digit.

The net result of this entire process is that once each second, in this example, the spoken digits "1" through "8" are simultaneously synthesized and individually output through the eight channels 50, thus providing easily-discriminated audio signals suitable for tracing eight lines. It should be noted that the implementation need not be limited to eight signals. Furthermore, it is not necessary to limit the synthesized speech to digits or even to a specific spoken language.

The invention can be implemented using any of a variety of digital and linear component technologies. For example, a programmable microcontroller can be used to implement the operations of the clock 32 and the binary counter 34. Additionally implementation factors which can be varied include, but are not limited to, the speech digitization sampling rate, D/A converter resolution, and the number of audio channels. Various other modifications and improvements thereon will become readily apparent to those skilled in the art. Accordingly, the spirit and scope of the present invention is to be construed broadly and limited only by the appended claims, and not by the foregoing specification.

What is claimed is:

1. A method of simultaneously tracing a plurality of transmission lines from a first location to a second location, comprising the steps of:
   (a) synthesizing a speech signal;
   (b) selectively applying said speech signal at said first location to each transmission line to be traced, comprising the steps of:
      (i) transmitting an address of a memory location in a speech read only memory, wherein said speech read only memory is formatted and arranged to store and output distinct segments of speech;
      (ii) retrieving one of said speech segments from said memory location of said speech read only memory;
      (iii) converting said one of said speech segments to an analog output representative of said one of said speech segments; and
      (iv) routing said analog output to an audio channel;
   wherein each of said transmission lines receives a unique segment of said speech signal that differs from the segment of said speech signal applied to any other of said transmission lines;
   (c) detecting at said second location, said unique segment of said speech signal applied to each said transmission line.

2. The method of claim 1 wherein said synthesized speech signal is converted from a digital signal to an analog signal prior to being applied to said each transmission line to be traced.

3. The method of claim 1 wherein said synthesized speech is in the form of a string of sequential numbers.

4. The method of claim 1 wherein said speech read only memory is organized as 32,768 eight-bit bytes with 4096 bytes allocated for each spoken digit.

5. The method of claim 1, wherein said speech read only memory stores digitized digits in an interleaved format.

6. The method of claim 1, wherein step (b) (ii) comprises scanning said speech read only memory sequentially thereby outputting said speech segment.

7. An apparatus for simultaneously tracing a plurality of transmission lines from a first location to a second location comprising:
   a means for synthesizing distinct segments of speech to be applied to one or more of said plurality of transmission lines to be traced, comprising:
      a speech read only memory being formatted and arranged to store and output said distinct segments of speech;
      a transmitting means for transmitting an address of a memory location in said speech read only memory;
      a retrieving means for retrieving said speech segment from said memory location of said speech read only memory;
   a switching means for selectively connecting and disconnecting said segments of speech to said one or more of said plurality of transmission lines to be traced; and
   a control means for controlling the output of said segments of said speech through said switching means.

8. The apparatus of claim 1 further comprising a digital to analog convertor for converting said digitized speech into analog signals representative of said digitized speech.

9. The apparatus of claim 1 wherein said control means includes a clock source and address counter.

10. The apparatus of claim 7 wherein said speech read only memory is organized as 32,768 eight-bit bytes with 4096 bytes allocated for each spoken digit.

11. The apparatus of claim 7, wherein said speech read only memory stores digitized digits in an interleaved format.

12. The apparatus of claim 7, wherein said retrieving means comprises a scanning means for scanning said speech read only memory sequentially thereby outputting said speech segment.

* * * * *